(12) United States Patent
Oyabu (10) Patent No.: US 9,643,380 B2
(45) Date of Patent: May 9, 2017

(54) CARBON FIBRE REINFORCED COMPOSITE MATERIAL AND PRODUCTION METHOD THEREOF

(71) Applicant: INOAC CORPORATION, Nagoya-shi, Aichi (JP)

(72) Inventor: Jun Oyabu, Anjo (JP)

(73) Assignee: INOAC CORPORATION, Nagoya-shi, Aichi (JP)

( * ) Notice: Subject to any disclaimer, the term of this patent is extended or adjusted under 35 U.S.C. 154(b) by 445 days.

(21) Appl. No.: 14/233,090

(22) PCT Filed: Oct. 1, 2012

(86) PCT No.: PCT/JP2012/075422
§ 371 (c)(1),
(2) Date: Jan. 15, 2014

(87) PCT Pub. No.: WO2014/010106
PCT Pub. Date: Jan. 16, 2014

(65) Prior Publication Data
US 2014/0199515 A1 Jul. 17, 2014

(30) Foreign Application Priority Data
Jul. 12, 2012 (JP) .................................. 2012-156939

(51) Int. Cl.
*B32B 5/02* (2006.01)
*B29C 70/46* (2006.01)
(Continued)

(52) U.S. Cl.
CPC .............. *B32B 5/02* (2013.01); *B29C 70/026* (2013.01); *B29C 70/465* (2013.01); *B32B 5/245* (2013.01);
(Continued)

(58) Field of Classification Search
CPC ....................................................... B32B 5/02
(Continued)

(56) References Cited

U.S. PATENT DOCUMENTS

| 5,043,127 A | 8/1991 | Brambach |
| 5,401,564 A * | 3/1995 | Lee .................. A43B 7/226 |
| | | 139/420 A |

(Continued)

FOREIGN PATENT DOCUMENTS

| EP | 1803551 A1 | 7/2007 |
| JP | 06-198794 A | 7/1994 |

(Continued)

OTHER PUBLICATIONS

Communication dated Feb. 25, 2015 from the European Patent Office in counterpart European Application No. 12880814.4.

(Continued)

*Primary Examiner* — Scott W Dodds
(74) *Attorney, Agent, or Firm* — Sughrue Mion, PLLC (57) ABSTRACT

A carbon fiber reinforced composite material including at least two carbon fiber fabrics and a thermoplastic resin, wherein each of the at least two carbon fiber fabrics is formed of an opened yarn obtained by opening a carbon fiber bundle, and the thermoplastic resin is impregnated with the at least two carbon fiber fabrics in a solidified state such that the carbon fiber reinforced composite material is formed integrally as a whole. Also disclosed is a method for producing the carbon fiber reinforced composite material.

10 Claims, 3 Drawing Sheets

(51) Int. Cl.
*C08J 5/04* (2006.01)
*B29C 70/02* (2006.01)
*B32B 5/24* (2006.01)
*B32B 27/12* (2006.01)
*B32B 27/34* (2006.01)
*B32B 27/36* (2006.01)

(52) U.S. Cl.
CPC .............. *B32B 27/12* (2013.01); *B32B 27/34* (2013.01); *B32B 27/365* (2013.01); *C08J 5/042* (2013.01); *B32B 2260/021* (2013.01); *B32B 2260/046* (2013.01); *B32B 2262/106* (2013.01); *B32B 2266/025* (2013.01); *B32B 2266/08* (2013.01); *B32B 2307/51* (2013.01); *B32B 2307/538* (2013.01); *B32B 2307/54* (2013.01); *B32B 2307/734* (2013.01); *B32B 2307/736* (2013.01); *B32B 2457/00* (2013.01); *Y10T 428/24355* (2015.01); *Y10T 428/249921* (2015.04)

(58) Field of Classification Search
USPC ........................................ 156/309.6; 264/258
See application file for complete search history.

(56) References Cited

U.S. PATENT DOCUMENTS

| | | | |
|---|---|---|---|
| 5,447,785 A * | 9/1995 | Kishi ..................... | B29C 70/08 139/36 |
| 5,783,278 A | 7/1998 | Nishimura et al. | |
| 2012/0237754 A1 | 9/2012 | Kasuga et al. | |

FOREIGN PATENT DOCUMENTS

| | | | |
|---|---|---|---|
| JP | 7-300739 | A | 11/1995 |
| JP | 3124267 | B2 | 1/2001 |
| JP | 2007-253573 | A | 10/2007 |
| JP | 2008-149708 | A | 7/2008 |
| JP | 2008-201006 | A | 9/2008 |
| JP | 2011-037910 | A | 2/2011 |
| JP | 2011-093175 | A | 5/2011 |
| TW | 200406441 | A | 5/2004 |
| WO | 2009/078388 | A1 | 6/2009 |

OTHER PUBLICATIONS

International Preliminary Report on Patentability issued by the International Searching Authority in counterpart International application No. PCT/JP2012/075422, issued on Jan. 13, 2015.
Communication dated May 3, 2016, from the European Patent Office in counterpart European application No. 12880814.4.
Communication dated Dec. 2, 2014, issued by the Taiwanese Patent Office in counterpart Taiwanese application No. 101138324.
International Search Report for PCT/JP2012/075422 dated Jan. 15, 2013.
Communication dated Sep. 24, 2014, issued by the Korean Intellectual Property Office in counterpart Application No. 1020137030813.
Communication dated Dec. 13, 2016, from the Japanese Patent Office in counterpart application No. 2013-034457.

* cited by examiner

CARBON FIBRE REINFORCED COMPOSITE MATERIAL AND PRODUCTION METHOD THEREOF

CROSS REFERENCE TO RELATED APPLICATIONS

This is a National Stage of International Application No. PCT/JP2012/075422 filed Oct. 1, 2012, claiming priority based on Japanese Patent Application No. 2012-156939 filed Jul. 12, 2012, the contents of all of which are incorporated herein by reference in their entirety.

TECHNICAL FIELD

The present invention relates to a carbon fibre reinforced composite material exhibiting excellent reprocessing and recycling properties as well as a suitable surface smoothness, and to a production method thereof.

BACKGROUND ART

Mobile electronic devices which have been developed recently may be sometimes intended for use outdoors. Therefore, the housing thereof is required to be made of a lightweight and thin-walled material having high stiffness. For example, Patent Document 1 proposes a carbon fibre reinforced composite material which is lightweight and thin-walled and has a high stiffness and is formed with a sandwich construction comprising two carbon fibre prepregs between which a thermosetting open-cell foam as a core material is laminated.

Patent Document 1: Japanese Patent Application Laid-open No. 2011-093175

DISCLOSURE OF THE INVENTION

However, the carbon fibre reinforced composite material proposed in Patent Document 1 comprises a thermosetting resin as a core material and thus cannot be deformed by heating, resulting in deteriorated reprocessing and recycling properties as well as difficulties in moulding into predetermined shapes by post-processing. Accordingly the present inventors contemplated using a thermoplastic resin in place of the thermosetting resin. However, it was observed that use of a thermoplastic resin in place of the thermosetting resin in the technique disclosed in Patent Document 1 resulted in a reduced surface smoothness during primary production and reprocessing processes which include steps of melting and curing of the resin. Thus an object of the present invention is to provide a carbon fibre reinforced composite material having excellent reprocessing and recycling properties as well as a preferable surface smoothness while maintaining its lightweight, low thickness and high stiffness.

The present inventors have found that the deteriorated surface smoothness upon use of a thermoplastic resin in place of a thermosetting resin is caused by residual voids inside of the carbon fibre reinforced composite material at the melting step of the resin, thereby completing the present invention.

The present invention is a carbon fibre reinforced composite material comprising at least two carbon fibre fabrics and a thermoplastic resin, wherein each of the at least two carbon fibre fabrics is formed of an opened yarn obtained by opening a carbon fibre bundle, and the thermoplastic resin is impregnated with the at least two carbon fibre fabrics in a solidified state such that the carbon fibre reinforced composite material is formed integrally as a whole.

The carbon fibre reinforced composite material according to the present invention may have, on at least one face thereof, a layer of a thermoplastic resin.

All thermoplastic resins contained in the carbon fibre reinforced composite material according to the present invention may be of the same kind.

The carbon fibre reinforced composite material according to the present invention may have a maximum height (Rmax) of 12.0 μm or less and a ten-point mean roughness (Rz) of 6.0 μm or less.

The carbon fibre reinforced composite material according to the present invention may have a flexural modulus of 25 GPa or more and a flexural strength of 170 MPa or more.

The carbon fibre reinforced composite material according to the present invention may have a thickness of 0.5 mm or less.

In the carbon fibre reinforced composite material according to the present invention, the solidified thermoplastic resin may be in non-foamy state.

Further, the present invention is a method for producing a carbon fibre reinforced composite material, this method including:

a step of carrying out thermal pressing of a laminate containing at least two carbon fibre fabrics of an opened yarn obtained by opening a carbon fibre bundle and also containing a foam of a thermoplastic resin between the at least two carbon fibre fabrics under a condition where the foam of the thermoplastic resin melts and the molten thermoplastic resin is impregnated with the at least two carbon fibre fabrics; and a step of solidifying the molten thermoplastic resin that has been penetrated with the two carbon fibre fabrics.

In the method for producing the carbon fibre reinforced composite material according to the present invention, the foam of the thermoplastic resin may be a closed-cell foam.

In the method for producing the carbon fibre reinforced composite material according to the present invention, a film of a thermoplastic resin may be disposed on at least one face of the carbon fibre fabric.

Here, the term "be disposed with" as used herein encompasses the embodiment wherein the film of the thermoplastic resin is bonded on the carbon fibre fabric (including temporary bonding or spot welding) as well as the embodiment wherein the film is not bonded to the fabric (the embodiment wherein the film merely contacts the fabric as Example 4 described hereinafter).

In the method for producing the carbon fibre reinforced composite material according to the present invention, the laminate may be formed of at least 5 layers of, in the order from one face, the film of the thermoplastic resin, the carbon fibre fabric, the foam of the thermoplastic resin, the carbon fibre fabric and the film of the thermoplastic resin.

In the method for producing the carbon fibre reinforced composite material according to the present invention, the laminate may be formed of only 7 layers of, in the order from one face, the film of the thermoplastic resin, the carbon fibre fabric, the film of the thermoplastic resin, the foam of the thermoplastic resin, the film of the thermoplastic resin, the carbon fibre fabric and the film of the thermoplastic resin.

In the method for producing the carbon fibre reinforced composite material according to the present invention, a thermoplastic resin of the foam of the thermoplastic resin and a thermoplastic resin of the film of the thermoplastic resin may be of the same kind.

Here, the step of carrying out thermal press and the step of solidifying the molten thermoplastic resin may be separate or continuous or may be partially or totally carried out simultaneously such as the step in which the resin is solidified while applying pressure and the like.

The "same kind" encompasses, in addition to the embodiment wherein a monomer (s) constituting polymers is completely identical to each other (one another), the embodiment wherein a skeleton of a monomer(s) constituting polymers is similar to each other (one another) (e.g., the embodiment wherein there is a difference(s) on a side chain(s) of a monomer(s) or a number of an element(s) constituting a monomer(s), concretely carbon, and so on).

The term "substantially non-cellular" refers to the state wherein foaming is not visually observed.

According to the present invention, a carbon fibre reinforced composite material exhibiting excellent reprocessing and recycling properties as well as a preferable surface smoothness can be provided while maintaining its lightweight, low thickness and high stiffness.

BEST MODE FOR CARRYING OUT THE INVENTION

An embodiment of the carbon fibre reinforced composite material according to the present invention is specifically described hereinafter by referring to FIGS. 1 to 4. The technical scope of the present invention is not limited by any means to the embodiment.

<<Carbon Fibre Reinforced Composite Material According to the Embodiment>>

As shown in FIGS. 1 to 4, a sheet-shaped carbon fibre reinforced composite material 100 according to the present embodiment includes two carbon fibre fabrics (opened yarn fabrics) 111 and 112 which are impregnated with a thermoplastic resin; a first thermoplastic resin layer (intermediate thermoplastic resin layer) 145 sandwiched between two opened yarn fabrics 111 and 112; and second thermoplastic resin layers (surface thermoplastic resin layers) 151 and 152 respectively provided on the faces (corresponding to the outer faces of the carbon fibre reinforced composite material 100) of two opened yarn fabrics 111 and 112 opposite to the faces thereof contacting to the first thermoplastic resin layer 145. The carbon fibre reinforced composite material 100 has a construction such that the first thermoplastic resin layer, the second thermoplastic resin layers and the carbon fibre fabrics are integrated by means of the thermoplastic resin. The construction and physical properties of the carbon fibre reinforced composite material 100 are described hereinbelow. The method for producing the carbon fibre reinforced composite material 100 according to the present embodiment, the carbon fibre reinforced composite material obtained thereby (construction, properties) and methods for use (applications) of the carbon fibre reinforced composite material according to the present embodiment are now described in turn.

<<Method for Producing Carbon Fibre Reinforced Composite Material According to the Embodiment>>

The method for producing the carbon fibre reinforced composite material 100 according to the present embodiment comprises the processes of thermal pressing a laminate 101 comprising carbon fibre sheets 130 (131 and 132) between which a foam of a thermoplastic resin (thermoplastic resin foam) 140 is sandwiched, wherein each of the carbon fibre sheets 130 contains an opened yarn fabric 110 (111 and 112) of an opened yarn (untangled and opened carbon fibre bundle) disposed with film-shaped thermoplastic resins (thermoplastic resin films) 120 (121 and 122) on upper and lower faces of the opened yarn fabric, so that the foam of the thermoplastic resin 140 and the film-shaped thermoplastic resin 120 are melted and the opened yarn fabric 110 is impregnated with the molten thermoplastic resins; and then cooling and solidifying the penetrated and molten thermoplastic resins in the opened yarn fabric. The materials and processes of the production method are detailed hereinafter.

<Materials>
[Opened Yarn Fabric]
{Construction}
(Opening)

The opened yarn fabric according to the present embodiment is formed as a plain weave of opened yarn. By using the opened yarn as a fibre for the fabric, the thickness of the fabric and the areal weight can be reduced. The opened yarn fabric allows better removal of voids from the opened weave textures during the thermal press process. As a result, the carbon fibre reinforced composite material 100 has a reduced amount of voids remained therein. Accordingly less voids in the carbon fibre reinforced composite material 100 can reach the surface layer thereof upon heating during reprocessing, resulting in prevention of deteriorated surface smoothness (vacancy or poor cell). The opened yarn fabric which is used in the present invention can be those disclosed in Japanese Patent Application Laid-open Nos. 2000-096387, 2000-110048, 2001-164441 and the like.

(Thickness)

The opened yarn fabric having an excessively high thickness may not allow removal of voids from the opened yarn fabric, resulting in an increased amount of voids remaining in the carbon fibre reinforced composite material 100. However, the opened yarn fabric having an excessively low thickness cannot exhibit a high stiffness which is required for carbon fibre reinforced composite materials. Thus the opened yarn fabric suitably has a thickness of 0.05 to 0.20 mm and more suitably 0.08 to 0.10 mm.

{Physical Properties and Characteristics}
(Areal Weight)

Employing the opened yarn fabric allows removal of voids formed in the carbon fibre reinforced composite material 100, while the opened yarn fabric having an excessively low areal weight may be prevented to exhibit a high stiffness. The opened yarn fabric having an excessively high areal weight may be bulgy despite its opened weave textures, resulting in prevention of removal of voids. Thus the opened yarn fabric suitably has an areal weight of 70 to 400 g/m², more suitably 30 to 160 g/m² and particularly suitably 40 to 90 g/m².

{Materials}

The opened yarn fabric according to the present embodiment is formed as a plain weave of opened yarn. The opened yarn which is a material for the opened yarn fabric according to the present embodiment is now described.

[Opened Yarn]

"Construction"

The opened yarn refers to one or several yarns (multifilament yarns) which are disposed flatly so that monofilaments are kept to be almost linear and in parallel. As a result, in this fibre yarn, monofilaments are slightly attached to each other and the weave textures of the carbon fibre bundles are easily opened.

Thickness

The opened yarn having a high thickness provides a thick opened yarn fabric and thus cannot provide a thin-walled carbon fibre reinforced composite material. Therefore the opened yarn suitably has a thickness of 1 μm to 60 μm.

Width

The opened yarn suitably has a width of 1 mm to 60 mm. The opened yarn having such a width can provide a preferable aspect ratio of the opened yarn.

Aspect Ratio

The opened yarn to be used for the carbon fibre reinforced composite material according to the present embodiment has an aspect ratio, which is the ratio of the width of the opened yarn and the thickness of the opened yarn (yarn width/yarn thickness), of suitably 30 or more. Such an aspect ratio can result in a reduced crimp angle and an excellent surface smoothness.

"Material"

The material of the opened yarn is not particularly limited and may be of PAN-based, pitch-based and the like, with PAN-based being preferable which is widely used.

[Thermoplastic Resin Film]

{Construction}

It is preferable that the opened yarn fabric 110 is preliminarily disposed with thermoplastic resin films on the upper and lower faces prior to the thermal press process. The opened yarn fabric disposed with a thermoplastic resin film on the lower face may compensate for the shortage of the resin in the carbon fibre reinforced composite material, and thus improve the workability and allow mass productivity. The opened yarn fabric disposed with the thermoplastic resin film on the upper face allows not only penetration of the thermoplastic resin film, but also lamination and formation of the thermoplastic resin layer on the surface, particularly on the surface where a design is provided, of the carbon fibre reinforced composite material, resulting in improvement in the surface smoothness of the composite material. It is preferable that the thermoplastic resin films are temporarily bonded on the upper and lower faces of the opened yarn fabric in advance. Although the materials used in Examples are the opened yarn fabric disposed with thermoplastic resin films on the upper face thereof, the thermoplastic resin layer can be formed on the surface of the carbon fibre reinforced composite material without using the thermoplastic resin film. For example, in the thermal press process, the thermoplastic resin foam is melted and the molten thermoplastic resin which has been sufficiently penetrated into the opened yarn fabric is solidified, so that the thermoplastic resin layer can be formed on the surface of the carbon fibre reinforced composite material.

(Thickness)

The thickness of the thermoplastic resin film is not particularly limited. However, in order to obtain a desired bulky portion of the composite material, it is desirable to reduce defects such as burrs and thickness deviation during moulding. Thus the thermoplastic resin film suitably has a thickness of 10 to 500 μm, more suitably 15 to 400 μm and particularly preferably 20 to 300 μm.

The thermoplastic resin film having a low thickness may not provide sufficient penetration into the opened yarn fabric. The thermoplastic resin film having a high thickness requires a high areal weight on the opened yarn fabric in order to obtain a thick composite material, which leads to render the opened yarn fabric bulky and necessarily increase an amount of the resin. Because the composite material has a predetermined plane area, there is no choice but to increase the thickness in order to increase the amount of the resin.

{Physical Properties and Characteristics}

(Thermal Shrinkage)

The thermoplastic resin film preferably does not undergo thermal shrinkage during thermal press moulding and preferably does not cause misalignment of the opened yarn fabric due to thermal shrinkage to result in occurrence of wrinkles and the like. The thermoplastic resin film is melted and penetrates to form a matrix during thermal press moulding without thermal shrinkage and misalignment.

{Material}

The thermoplastic resin film may be formed with, without particular limitation as far as it is thermoplastic, e.g. polyolefins such as polyethylene, polypropylene; polyamides such as nylon; polyesters such as polyethylene terephthalate, polybutylene terephthalate; polystyrenes, polycarbonates, polyphenylene sulfides and the like. The thermoplastic resin film of the thermoplastic resin which is the same kind as that of the thermoplastic resin foam may have an improved adhesiveness of the resin throughout the surface, rear surface and intermediate layer during the thermal press process, resulting in a high stiffness. The material for the thermoplastic resin film is particularly suitably polyethylenes, polycarbonates or polyamides in view of the required physical properties and of selecting the same material as the thermoplastic resin foam.

[Thermoplastic Resin Foam]

{Construction}

(Cells)

The thermoplastic resin foam provides a homogeneous composite material without voids because it exhibits the effect of a spring and the opened yarn fabric is impregnated with the molten resin to push and extend the fabric during the thermal press process. During the thermal press process, the thermoplastic resin foam is melted and serves as a buffering layer and it ensures the carbon fibre is impregnated with the thermoplastic resin.

The thermoplastic resin foam is preferably a closed-cell foam. This configuration promotes removal of voids. The foam may have an open-cell structure. The foam may be produced by either chemical or physical foaming. The foam may be an open-cell foam which is formed by making closed cells and then physically crushing the closed cells to interconnect therebetween.

In the laminated construction of the composite material, the thermoplastic resin foam sandwiched as an intermediate layer before moulding serves as an intermediate layer after moulding. The thermoplastic resin foam forming the intermediate layer is compressed so that the upper and lower carbon fibre sheets attach and are entangled with each other.

As a result, a carbon fibre reinforced layer in which the carbon fibre sheet is impregnated with the thermoplastic resin is formed.

(Thickness)

The thermoplastic resin foam having an excessively high thickness is difficult to be compressed during the thermal press process. The thermoplastic resin foam having an excessively low thickness has reduced effect of a spring. Thus the thermoplastic resin foam suitably has a thickness of 1.5 mm to 2.3 mm.

{Physical Properties and Characteristics}

The thermoplastic resin foam having a high thickness generally tends to result in a high elastic modulus because it increases the distance between two opened yarn fabrics even after the thermal press. The thermoplastic resin foam having a relatively low thickness decreases the elastic modulus because it reduces the distance between two opened yarn fabrics. The thermoplastic resin foam has a density of 15 to 80 kg/m$^3$. The foam having the density within this range may provide an appropriate effect of a spring in order to mould the composite material having a desired thickness and allows an appropriate amount of impregnation, providing the carbon fibre reinforced composite material having a desired stiffness.

(Cell Structure)

During the thermal press process, the thermoplastic resin foam exhibits an effect of a spring. Namely due to the effect of a spring of the thermoplastic resin foam, the opened yarn fabrics are pushed toward the press surface. Simultaneously, the thermoplastic resin films on the upper and lower faces of the opened yarn fabrics are pushed towards the opened yarn fabrics, promoting penetration of the molten thermoplastic resin films into the opened yarn. As a result, the carbon fibre reinforced composite material is obtained which is thin-walled and has a high stiffness and a preferable surface smoothness. The thermoplastic resin foam suitable for exhibiting the effect of a spring preferably has a closed-cell structure. It is believed that, the closed cell structure may allow degasification according to the pressure applied during melting while thermal pressing and that air enclosed in closed cells expands and explodes the cells, which results in the effect of a spring.

{Material}

The material is not particularly limited as far as it is thermoplastic and may be, for example, polyolefins such as polyethylene, polypropylene; polyamides such as nylon; polyesters such as polyethylene terephthalate, polybutylene terephthalate; polystyrenes, polycarbonates, polyphenylene sulfides and the like. The thermoplastic resin foam of the thermoplastic resin which is the same kind as that of the thermoplastic resin film may have an improved adhesiveness between the resins during the thermal press process, resulting in a high stiffness. The material for the thermoplastic resin foam is particularly suitably polyethylenes, polycarbonates or polyamides in view of the required physical properties and of selecting the same material as the thermoplastic resin film.

<Manufacturing Process>

[Carbon Fibre Sheet Formation Process]

Figure 2:
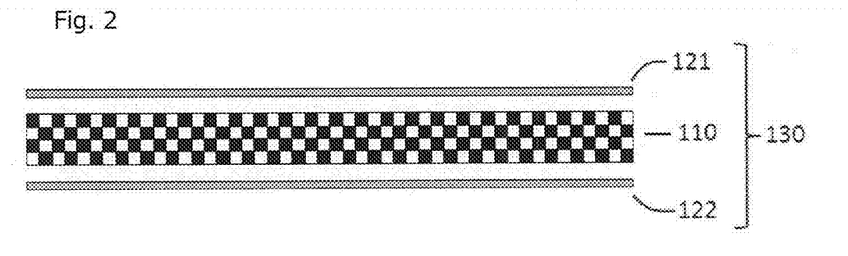
FIG. 2 is a conceptual view of a carbon fibre sheet prior to thermal press according to the present embodiment.

The thermoplastic resin films 120 (121 and 122) are laminated on the upper and lower faces of the opened yarn fabric 110 and the thermoplastic resin films are then temporarily bonded thereto by spot welding and the like to form a carbon fibre sheet 130 (FIG. 2).

[Laminate Formation Process]

Figure 1:
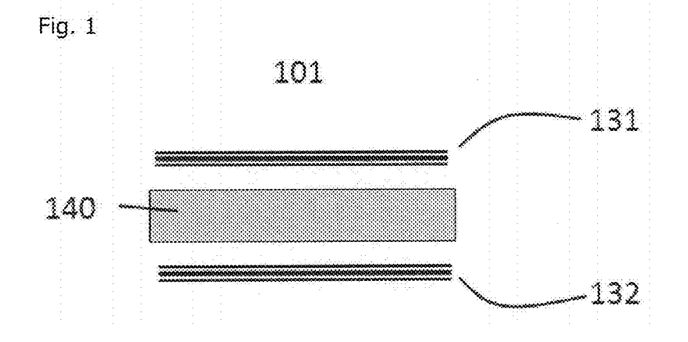
FIG. 1 is a conceptual view of a laminate (prior to thermal press) comprising carbon fibre sheets having a thermoplastic resin foam sandwiched therebetween according to the present embodiment.

The carbon fibre sheets 130 (131 and 132) are then laminated on the upper and lower faces of a thermoplastic resin closed-cell foam 140 to form a laminate 101 (FIG. 1).

[Thermal Press Process]

Figure 3:
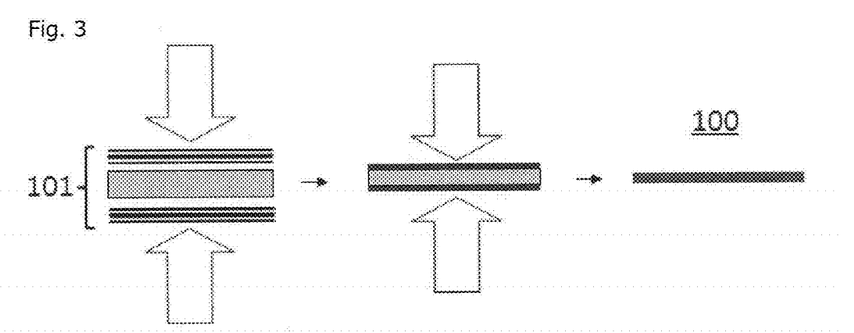
FIG. 3 is a conceptual view of a thermal press process during production of a carbon fibre reinforced composite material according to the present embodiment.

The laminate 101 is subjected to thermal press from the direction of laminated faces to melt partial or whole thermoplastic resin films laminated to the carbon fibre sheets and/or thermoplastic resin closed-cell foam to give the resin that forms the bulky portion of the carbon fibre reinforced composite material. On this occasion, the thermoplastic resin closed-cell foam is compressed by thermal press to exhibit the effect of a spring (FIG. 3).

Application of pressure may generally be carried out at 0.25 to 0.75 MPa at an ambient temperature of 15 to 35° C. for 3 to 20 minutes although the conditions may vary according to the size or thickness of a moulded article. The temperature may be raised to 200 to 300° C. during heating. In the present invention, a relatively thin plate of 0.2 to 0.5 mm is moulded and thus it is not required to secure a certain space upon pressing using a spacer.

[Cooling Process]

The molten resin from the thermal press process is allowed to stand under a normal temperature atmosphere in order to cool and cure the resin to form the carbon fibre reinforced composite material 100.

<<Construction of Carbon Fibre Reinforced Composite Material of the Embodiment>>

Figure 4:
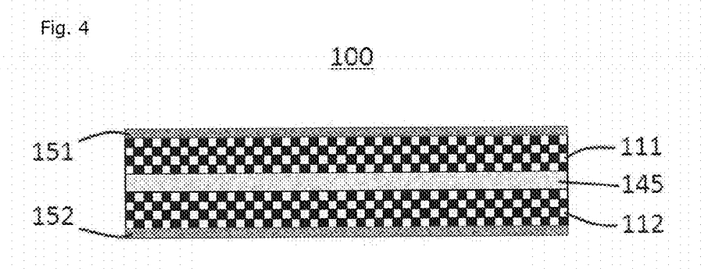
FIG. 4 is a conceptual view of a formed carbon fibre reinforced composite material according to the present embodiment.

The carbon fibre reinforced composite material 100 has an integrated construction by means of the thermoplastic resins and has the surface thermoplastic resin layers 151 and 152 on the surfaces thereof. The opened yarn fabrics 111 and 112 in the carbon fibre reinforced composite material 100 are disposed at outer sides in the thickness due to the effect of a spring of the thermoplastic resin foam (FIG. 4). The thermal carbon fibre reinforced composite material 100 may contain, in the central part thereof, an intermediate thermoplastic resin layer 145 which is formed with the residue of the thermoplastic resin foam or other thermoplastic resins which has/have not melted during the thermal press process. The surface thermoplastic resin layer may not be always formed on both surfaces of the carbon fibre reinforced composite material 100 and may be formed only on one surface (e.g. the face where a design is provided).

<Thickness>

The carbon fibre reinforced composite material having a low thickness allows, when the material is used as a housing of electronic devices and the like, lightweight and an increased inner volume as well as an increased storage efficiency and interior design flexibility. Thus the carbon fibre reinforced composite material suitably has a thickness of 0.2 to 0.5 mm, more suitably 0.25 to 0.40 mm and particularly suitably 0.27 to 0.38 mm.

<<Physical Properties and Characteristics of Carbon Fibre Reinforced Composite Material According to the Embodiment>>

The carbon fibre reinforced composite material which has an excellent surface smoothness can be obtained because the opened yarn and the thermoplastic resin foam are used in combination, resulting in a synergistic effect. Namely, in addition to the effect of a spring of the thermoplastic resin foam, the opened yarn fabric having opened carbon fibre bundles allows prompt penetration of the molten resin therein and prompt removal of voids existing therein through the opened weave textures of the yarn. Thus the bulky portion contains less voids and has the reduced surface roughness caused by voids during primary production and reprocessing processes, resulting in forming of a carbon fibre reinforced composite material having a preferable surface smoothness while maintaining its lightweight, low thickness and high stiffness. The carbon fibre reinforced composite material obtained according to the present embodiment has surface roughness values in terms of the maximum height (Rmax) of about 5.0 to 12.0 μm and of the ten-point mean roughness (Rz) of about 2.5 to 6.0 μm, as well as a flexural modulus of about 25 to 65 GPa and a flexural strength of about 170 to 660 MPa.

<<Application of Carbon Fibre Reinforced Composite Material According to the Embodiment>>

The present invention provides a carbon fibre reinforced composite material which has excellent reprocessing and recycling properties, has reduced voids therein, and has an excellent surface smoothness while maintaining its lightweight, low thickness and high stiffness. Therefore it is useful as a housing material for various devices including mobile electronic devices.

EXAMPLES

The present invention is specifically described hereinafter by way of Examples. The technical scope of the present invention is not limited by any means to these Examples.

Example 1

A 24K (the number of filaments: 24000) PAN-based carbon fibre original yarn (tensile strength: 5800 MPa, tensile modulus: 290 GPa) is subjected to opening treatment to obtain an opened yarn. The opened yarn is weaved on a loom dedicated for opened yarn fabrics (e.g. the one disclosed in Japanese Patent Application Laid-open No. 2003-253547). The obtained opened yarn fabric of plain weave has an areal weight of 78 g/m² and a thickness of 0.1 mm.

A polyamide (Nylon 6) closed-cell foam having a thickness of 2.0 mm and a density of 52 kg/m³ was used as the thermoplastic resin foam. The thermoplastic resin film used was a polyamide EMBLEM™ sheet of 25 μm from UNITIKA LTD.

The thermoplastic resin films were applied on both faces of the opened yarn fabric and a carbon fibre sheet was formed as an intermediate material. A laminate containing the intermediate materials, the carbon fibre sheets, laminated on the upper and lower faces of the thermoplastic resin foam was subjected to thermal press. Thus the laminate having 7 layers in total was subjected to thermal press, the layers corresponding to the central thermoplastic resin foam, the thermoplastic resins on both faces thereof, two carbon fibre fabrics respectively on the resins and the thermoplastic resin films on the surface and rear surface as the outermost layers.

The laminate was subjected to thermal press under the pressing conditions of the pressure of 0.49 MPa, the pressing duration of 10 minutes, the ambient temperature of 23° C. and the heating conditions of the temperature of 280° C. and the duration of 10 minutes. After opening the mould and demoulding, the laminate was left to stand in a normal temperature atmosphere in order to cool and cure to obtain a carbon fibre reinforced composite material having a thickness of 0.27 mm. The carbon fibre reinforced composite material had surface roughness values in terms of the maximum height (Rmax) of 6.9 μm and the ten-point mean roughness (Rz) of 3.1 μm.

Example 2

A carbon fibre reinforced composite material having a thickness of 0.36 mm was formed according to the production method described in Example 1 with a polyethylene closed-cell foam, ZOTEK NB-50 (INOAC CORPORATION), having a thickness of 1.8 mm and a density of 55 kg/m³ as the thermoplastic resin foam and with a polyamide EMBLEM sheet having a thickness of 25 μm from UNITIKA LTD as the thermoplastic resin film.

Example 3

A carbon fibre reinforced composite material having a thickness of 0.28 mm was formed according to the production method described in Example 1 with a polyamide (Nylon 6) closed-cell foam, ZOTEK NB-50 (INOAC CORPORATION), having a thickness of 2.0 mm and a density of 52 kg/m³ as the thermoplastic resin foam and with a polycarbonate sheet having a thickness of 30 μm from INTERNATIONAL CHEMICAL CO., LTD as the thermoplastic resin film.

Example 4

A carbon fibre reinforced composite material having a thickness of 0.38 mm was formed with a polyethylene closed-cell foam, ZOTEK NB-50 (INOAC CORPORATION), having a thickness of 1.8 mm and a density of 55 kg/m³ as the thermoplastic resin foam as well as a polycarbonate sheet having a thickness of 30 μm from INTERNATIONAL CHEMICAL CO., LTD. At the thermal press moulding, the carbon fibre sheets, i.e. the intermediate material, were not moulded. Alternatively the thermoplastic resin film, the carbon fibre fabric, the thermoplastic resin foam, the carbon fibre fabric and the thermoplastic resin film were laminated in the order in a press mould and these 5 layers were subjected to the thermal press moulding simultaneously. The obtained composite material had surface roughness values in terms of Rmax of 10.4 μm and Rz of 4.9 μm.

<<Evaluation Tests>>

The carbon fibre reinforced composite materials obtained in Examples 1 to 4 were compared for flexural modulus and flexural strength. Comparative Examples used were carbon fibre reinforced composite materials obtained by using a single unopened carbon fibre fabric for lamination with a matrix resin without using a thermoplastic resin foam. A carbon fibre reinforced composite material of Comparative Example 1 had a thickness of 0.32 mm with the matrix resin used being a polyamide. A carbon fibre reinforced composite material of Comparative Example 2 had a thickness of 0.35 mm with the matrix resin used being a polycarbonate. The composite material of Comparative Example 1 had surface roughness values in terms of Rmax of 41.6 μm and Rz of 31.3 μm which reflected the weave textures of the unopened carbon fibre fabric.

Table 1 shows the results for Examples 1 to 4 and Comparative Examples 1 and 2. Flexural strength and flexural modulus were measured according to JIS K7017 (Fibre-reinforced plastics composites—Determination of flexural properties). The surface roughness was measured according to JIS 0601-1976 on a stylus kind surface roughness tester.

Figure 5:
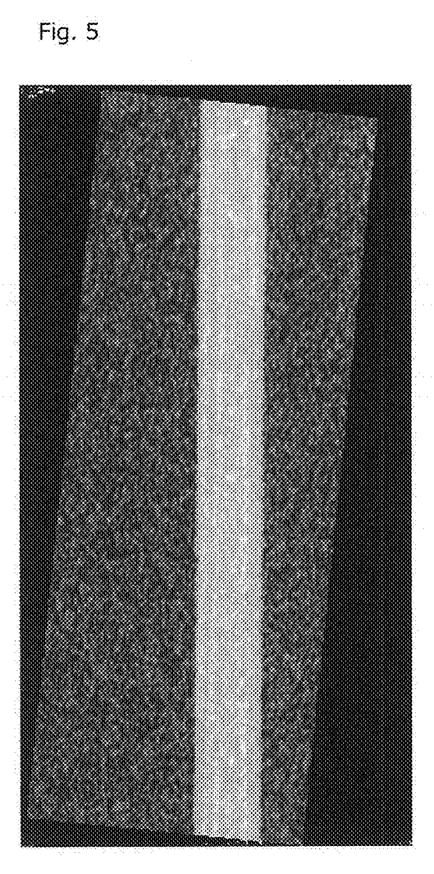
FIG. 5 is a section view of a carbon fibre reinforced composite material according to Example 1.
Figure 6:
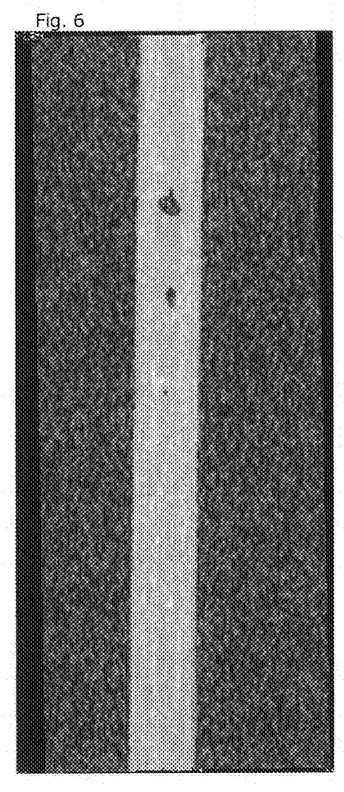
FIG. 6 is a section view of a carbon fibre reinforced composite material according to Comparative Example 3.

FIG. 5 is a section view of the carbon fibre reinforced composite material according to Example 1. FIG. 6 is a section view of the carbon fibre reinforced composite material according to Comparative Example 3. Comparative Example 3 had the same constructions as Example 1 except that a conventional unopened carbon fibre fabric was used instead of the opened yarn fabric used in Example 1.

In these figures, almost white parts correspond to the sections of the carbon fibre reinforced composite materials and almost black spots in the section of the carbon fibre reinforced composite material correspond to voids. Defects of voids were observed in the carbon fibre reinforced composite material according to Comparative Example 3 while defects of voids were not observed in the carbon fibre reinforced composite material according to Example 1. Using thin opened yarn fabrics during moulding of thin composite materials and thereby reducing the thickness of layers in laminates promotes removal of gas from thermoplastic resin foam layers and is very effective in moulding processes of moulded articles having designed faces on device housings. Similarly, no void was observed for composite materials of Examples 2 to 4. The number of defects due to voids was reduced significantly and the percentage of defective moulded articles was reduced by half.

Placing the thermoplastic resin layers on the surfaces of the composite materials allows transfer of smooth faces of the press mould, so that no irregularity due to the opened yarn fabric was visually observed.

TABLE 1

| | Fabric Fibre | | | | | Thickness | | | |
| | | | | | Original | of | Number | | |
| | Weave | Thickness of Fabric | Area/ Weight (g/m2) | Film Serving as Matrix Resin | Core Material Form | Thickness of Core Material before Lamination | Moulded Article (mm) | of Fabric Layers Laminated | Flexural Modulus (GPa) | Flexural Strength (MPa) |
| --- | --- | --- | --- | --- | --- | --- | --- | --- | --- | --- |
| Example 1 | Opened Plain Weave | 0.1 | 78 | Polyamide | Nylon 6 | 2.00 | 0.27 | Two on Both Surfaces | 62.4 | 642 |
| Example 2 | Opened Plain Weave | 0.1 | 78 | Polyamide | Olefin | 1.80 | 0.36 | Two on Both Surfaces | 30.4 | 200 |
| Example 3 | Opened Plain Weave | 0.1 | 78 | Polycarbonate | Nylon 6 | 2.00 | 0.28 | Two on Both Surfaces | 52 | 532 |
| Example 4 | Opened Plain Weave | 0.1 | 78 | Polycarbonate | Olefin | 1.80 | 0.38 | Two on Both Surfaces | 32.3 | 190 |
| Comparative Example 1 | Plain Weave | 0.25 | 200 | Polyamide | None | None | 0.32 | One | 9.7 | 171 |
| Comparative Example 2 | Plain Weave | 0.25 | 200 | Polycarbonate | None | None | 0.32 | One | 9.9 | 192 |

EXPLANATION OF REFERENCE NUMERALS

100 Carbon fibre reinforced composite material
101 Laminate
110 to 112 Opened yarn fabric
121 and 122 Thermoplastic resin film
130 to 132 Carbon fibre sheet
140 Thermoplastic resin foam
145 Intermediate thermoplastic resin layer
151 and 152 Surface thermoplastic resin layer

The invention claimed is:

1. A method for producing a carbon fibre reinforced composite material,
the method comprising:
a step of carrying out thermal pressing of a laminate comprising
(a) at least two carbon fibre fabrics of an opened yarn obtained by opening a carbon fibre bundle and
(b) a foam of a thermoplastic resin between the at least two carbon fibre fabrics
wherein the foam of the thermoplastic resin melts to form a molten thermoplastic resin and the molten thermoplastic resin is impregnated into the at least two carbon fibre fabrics; and
a step of solidifying the molten thermoplastic resin that has been penetrated into the two carbon fibre fabrics to form the carbon fibre reinforced composite material;
wherein the foam of the thermoplastic resin is a closed-cell foam; and
in the thermal pressing step, the foam of the thermoplastic resin exhibits a spring effect to promote penetration of the molten thermoplastic resin into the two carbon fibre fabrics and removal of voids.

2. The method according to claim 1, wherein a film of a thermoplastic resin is disposed on at least one face of the carbon fibre fabric.

3. The method according to claim 1, wherein the laminate is formed of at least 5 layers of, in the order from one face, the film of the thermoplastic resin, the carbon fibre fabric, the foam of the thermoplastic resin, the carbon fibre fabric and the film of the thermoplastic resin.

4. The method according to claim 1, wherein the laminate is formed of only 7 layers of, in the order from one face, the film of the thermoplastic resin, the carbon fibre fabric, the film of the thermoplastic resin, the foam of the thermoplastic resin, the film of the thermoplastic resin, the carbon fibre fabric and the film of the thermoplastic resin.

5. The method according to claim 2, wherein a thermoplastic resin of the foam of the thermoplastic resin and a thermoplastic resin of the film of the thermoplastic resin are of the same kind.

6. The method according to claim 1, wherein all thermoplastic resins contained in the carbon fibre reinforced composite material are of the same kind.

7. The method according to claim 1, wherein a maximum height (Rmax) thereof is 12.0 μm or less, a ten-point mean roughness (Rz) thereof is 6.0 μm or less, a flexural modulus thereof is 25 GPa or more, a flexural strength is 170 MPa or more and a thickness thereof is 0.5 mm or less.

8. The method according to claim 1, wherein the solidified thermoplastic resin is substantially in non-foamy state.

9. The method of claim 1, wherein the thermoplastic resin is polyamide (Nylon 6) or polyethylene.

10. The method of claim 1, wherein the thermoplastic resin foam in the laminate has a thickness of from 1.5 mm to 2.3 mm prior to step of carrying out the thermal pressing, and
wherein the carbon fibre reinforced composite material has a thickness of from 0.2 to 0.5 mm.

* * * * *